United States Patent
Danell et al.

(10) Patent No.: US 11,336,212 B2
(45) Date of Patent: May 17, 2022

(54) ELECTROMECHANICAL STATOR, MOTOR AND METHOD FOR DRIVING AN ELECTROMECHANICAL MOTOR

(71) Applicant: PIEZOMOTOR UPPSALA AB, Uppsala (SE)

(72) Inventors: Andreas Danell, Vattholma (SE); Pär Gustafsson, Uppsala (SE); Jan Söderkvist, Täby (SE)

(73) Assignee: PIEZOMOTOR UPPSALA AB, Uppsala (SE)

( * ) Notice: Subject to any disclaimer, the term of this patent is extended or adjusted under 35 U.S.C. 154(b) by 113 days.

(21) Appl. No.: 16/643,169

(22) PCT Filed: Aug. 31, 2018

(86) PCT No.: PCT/SE2018/050872
§ 371 (c)(1),
(2) Date: Feb. 28, 2020

(87) PCT Pub. No.: WO2019/045630
PCT Pub. Date: Mar. 7, 2019

(65) Prior Publication Data
US 2020/0266730 A1    Aug. 20, 2020

(30) Foreign Application Priority Data
Sep. 1, 2017    (SE) .................................... 1751059-5

(51) Int. Cl.
*H02N 2/02*    (2006.01)
*H02N 2/00*    (2006.01)
(Continued)

(52) U.S. Cl.
CPC ............. *H02N 2/026* (2013.01); *H02N 2/006* (2013.01); *H02N 2/065* (2013.01); *H02N 2/0015* (2013.01); *H02N 2/103* (2013.01)

(58) Field of Classification Search
CPC ........ H02N 2/026; H02N 2/006; H02N 2/065; H02N 2/103; H02N 2/0015
See application file for complete search history.

(56) References Cited

U.S. PATENT DOCUMENTS 5,854,529 A * 12/1998 Ashizawa ............ H02N 2/0045
310/323.01
6,882,084 B2    4/2005 Johansson et al.
(Continued)

FOREIGN PATENT DOCUMENTS

JP    H08-322271 A    12/1996
JP    H09-047045 A    2/1997
(Continued)

OTHER PUBLICATIONS

International Search Report and Written Opinion, dated Sep. 27, 2018, from corresponding PCT application No. PCT/SE2018/050872.
(Continued)

*Primary Examiner* — Emily P Pham
(74) *Attorney, Agent, or Firm* — Nixon & Vanderhye

(57) ABSTRACT

An electromechanical stator includes an actuator section, a support section and a spring section. A continuous sheet of elastic material constitutes at least a part of each of these sections. The actuator section includes a vibration body and a moved-body interaction portion. The vibration body includes an electromechanical volume. The spring section is elastic, with a spring constant, enabling provision of a normal force in the vibration direction upon displacement of the fixation point. Also an electromechanical motor and a method of operating such an electromechanical motor are disclosed.

13 Claims, 11 Drawing Sheets

(51) Int. Cl.
H02N 2/06 (2006.01)
H02N 2/10 (2006.01)

(56) References Cited

U.S. PATENT DOCUMENTS

| | | | |
|---|---|---|---|
| 6,967,430 | B2 | 11/2005 | Johansson |
| 2005/0073219 | A1 | 4/2005 | Johansson |
| 2010/0060107 | A1* | 3/2010 | Seki ................ H02N 2/0055 310/323.16 |
| 2011/0050035 | A1 | 3/2011 | Wischnewskiy et al. |
| 2011/0062823 | A1 | 3/2011 | Seki et al. |
| 2013/0147978 | A1 | 6/2013 | Ohashi et al. |
| 2014/0210311 | A1* | 7/2014 | Snis ................ H02N 2/003 310/323.02 |
| 2015/0158184 | A1 | 6/2015 | Kamijo et al. |

FOREIGN PATENT DOCUMENTS

| | | |
|---|---|---|
| WO | 2004/112232 A1 | 12/2004 |
| WO | 2005/031888 A1 | 4/2005 |
| WO | 2020/171770 A1 | 8/2020 |

OTHER PUBLICATIONS

Extended European Search Report issued in European Patent Application No. 18852578.6 dated May 3, 2021.

* cited by examiner

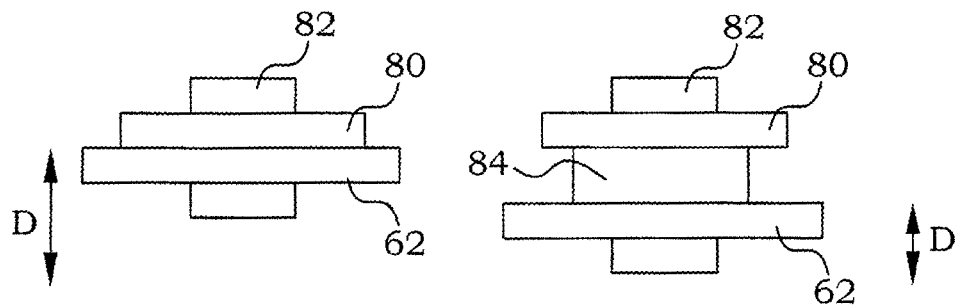
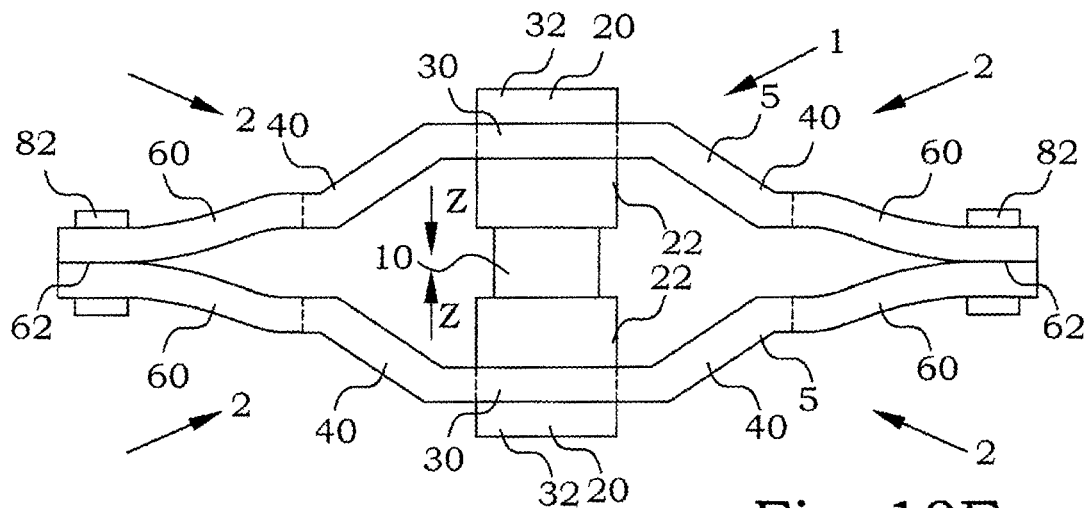
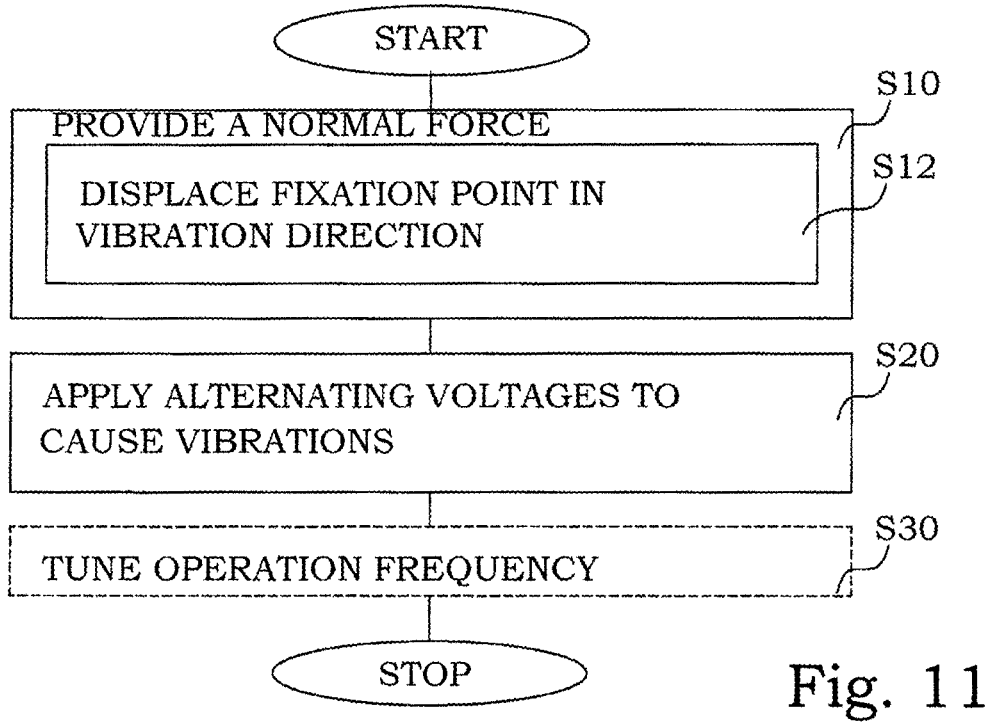

ELECTROMECHANICAL STATOR, MOTOR AND METHOD FOR DRIVING AN ELECTROMECHANICAL MOTOR

TECHNICAL FIELD

The proposed technology generally relates to electromechanical motors, and in particular to electromechanical motors utilizing vibrating elements comprising electromechanical material, vibrating in the ultrasound area and methods for driving such motors.

BACKGROUND

Electromechanical driving elements have in prior art been used for many types of miniature motor applications. A large portion of these motors are based on ultrasonic operation of the electromechanical driving elements. Typical examples of electromechanical materials are piezoelectric, electrostrictive and antiferroelectric materials and these materials could be single crystalline as well as polycrystalline or amorphous.

Piezoelectric materials are popular to use due to the relative simplicity in activation of the piezoelectric effect. Many different designs are available. In the PiezoWave® motor, a piezoelectric bar is put into resonance. A drive pad on the bar is in contact with a body to be moved, and the motion of the drive pad is transferred into a moving action relative the body to be moved. This is a compact solution that has been advantageously used in many types of applications.

In the published international patent applications WO2004/112232 and WO2005/031888 A1, motors that comprise piezo elements that create vibration of a sheet metal through a less rigid portion are disclosed. This connecting portion thus works as a link between the resonators and may by proper designs withstand high preloads without involving the piezo elements.

Common for many of these types of motors is that a contact point of a stator is moved repeatedly in a closed loop. Typically, the loop corresponds to a path close to an elliptical path if the contact point is allowed to move without external interactions. However, the interaction between the moving contact point and the body to be moved creates the total motion. During one part of the loop, the contact point is in mechanical contact with the body to be moved and interacts with the body to achieve the requested motion thereof. During another part of the loop, the contact point is instead free from mechanical contact and may thereby be "reset" to prepare for a new driving contact. In order for such a driving scheme to be operable, a normal force has to be provided between the stator and the body to be moved. This normal force presses the stator against the body to be moved. The motion of the contact point is typically very fast and the inertia of the stator enables the contact point to be temporarily removed completely from the surface of the body to be moved, if an appropriate normal force is applied. Too high or too low applied normal forces gives typically a non-optimum operation. It is therefore a request to select a proper, well-defined, normal force in order to achieve an efficient motion.

Piezoelectric motors are often used in miniaturized systems, which puts further restrictions to the arrangements providing the normal forces.

SUMMARY

A general object is to provide electromechanical motors and operation methods thereof, which enables use of well-defined normal forces within a limited space.

The above object is achieved by methods and devices according to the independent claims. Preferred embodiments are defined in dependent claims.

In general words, in a first aspect, an electromechanical stator comprises an actuator section, a support section and a spring section. A continuous sheet of elastic material constitutes at least a part of the actuator section, at least a part of the support section and at least a part of the spring section. The actuator section comprises a vibration assembly comprising at east one vibration body and a moved-body interaction portion. The vibration body comprises an electromechanical volume attached to a part of the continuous sheet of elastic material, wherein the vibration body is arranged for causing bending vibrations, in a vibration direction transverse to the plane of the continuous sheet of elastic material, when alternating voltages are applied to the electromechanical volume. The support section is attached between the actuator section and the spring section. The support section is connected with at least one fixation point via the spring section. The spring section is elastic, with a spring constant, regarding displacements, in the vibration direction, of the fixation point relative to a connection point between the spring section and the support section, thereby enabling provision of a normal force in the vibration direction on the moved-body interaction portion upon displacement of the fixation point in the vibration direction.

In a second aspect, an electromechanical motor comprises an electromechanical stator according to the first aspect, a body to be moved and a voltage supply arranged to supply alternating voltages to the electromechanical volume of said vibration body.

In a third aspect, a method for operating an electromechanical motor is presented. The electromechanical motor to be operated comprises an electromechanical stator having an actuator section, a support section and a spring section, wherein a continuous sheet of elastic material constitutes at least a part of the actuator section, at least a part of the support section and at least a part of the spring section. The actuator section comprises a vibration assembly comprising at least one vibration body and a moved-body interaction portion. The vibration body comprises an electromechanical volume attached to a part of the continuous sheet of elastic material. The support section is attached between the actuator section and the spring section. The support section is connected with at least one fixation point via the spring section, wherein the spring section is elastic, with a spring constant. The method comprises providing of a normal force in a vibration direction, transverse to the plane of said continuous sheet of elastic material, on the moved-body interaction portion by displacing the fixation point in the vibration direction relative to a connection point between the spring section and the support section. Alternating voltages are applied to the electromechanical volume, causing the vibration body to perform bending vibrations in the vibration direction.

One advantage with the proposed technology is that well defined normal forces and other operational conditions are provided by arrangements that are limited in space. Other advantages will be appreciated when reading the detailed description.

BRIEF DESCRIPTION OF THE DRAWINGS

The invention, together with further objects and advantages thereof, may best be understood by making reference to the following description taken together with the accompanying drawings, in which:

FIG. 10A-D are schematic illustrations of the use of distance elements for modifying a normal force;

FIG. 10E is a schematic illustration of the use of plastic deformation for modifying a relative distance; and FIG. 11 is a flow diagram of steps of an embodiment of a method for operating an electromechanical motor.

DETAILED DESCRIPTION

Throughout the drawings, the same reference numbers are used for similar or corresponding elements.

For a better understanding of the proposed technology, it may be useful to begin with a brief overview of some basic considerations concerning operation of ultrasonic electromechanical motors.

Figure 1A:
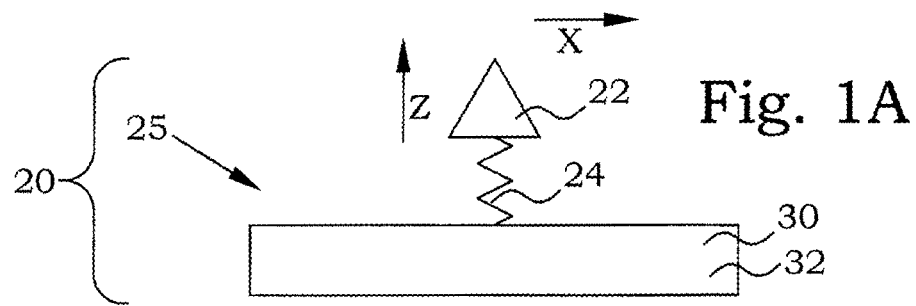
FIG. 1A is a schematic illustration of an embodiment of an actuator section 20.

FIG. 1A illustrates schematically an actuator section 20 of an electromechanical motor, having a vibration assembly 25. The vibration assembly 25 comprises a vibration body 30, in turn comprising an electromechanical volume 32 of electromechanically active material, which vibration body 30 causes vibrations when alternating voltages are applied to the electromechanical volume 32. The vibration assembly 25 further comprises a moved-body interaction portion 22, which is intended to be the part of the electromechanical stator interacting with the body to be moved. The total resilience 24 of the vibration assembly is indicated by a spring-like part in the figure.

Figure 1B:
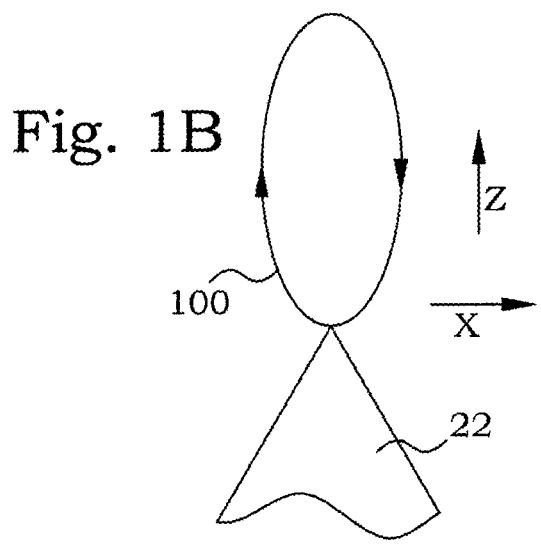
FIG. 1B is a schematic illustration of movements of a moved-body interaction portion.

If proper alternating voltages are provided to the electromechanical volume 32, the vibration body 30 can be caused to start to vibrate and the moved-body interaction portion 22 can typically be caused to move along a closed loop path 100, as schematically illustrated in FIG. 1B. This motion is then used in the electromechanical motor for achieving the displacement of the body to be moved. The actual details of how to achieve the closed loop path depends on the actual design of the vibration assembly 25 and is, as such, well known in prior art. The motion component in the X-direction close to the top of the closed loop path 100 can be used in mechanical interaction with the body to be moved to transfer a displacement force in the X direction. At the contrary, when the motion component in the negative X-direction close to the bottom of the closed loop path 100 is present, any mechanical interaction with the body to be moved should be avoided. The necessary function of providing and removing the mechanical contact with the body to be moved is performed by the motion component in the Z direction. This Z-direction movement will be the main subject of the present disclosure.

Figure 1C:
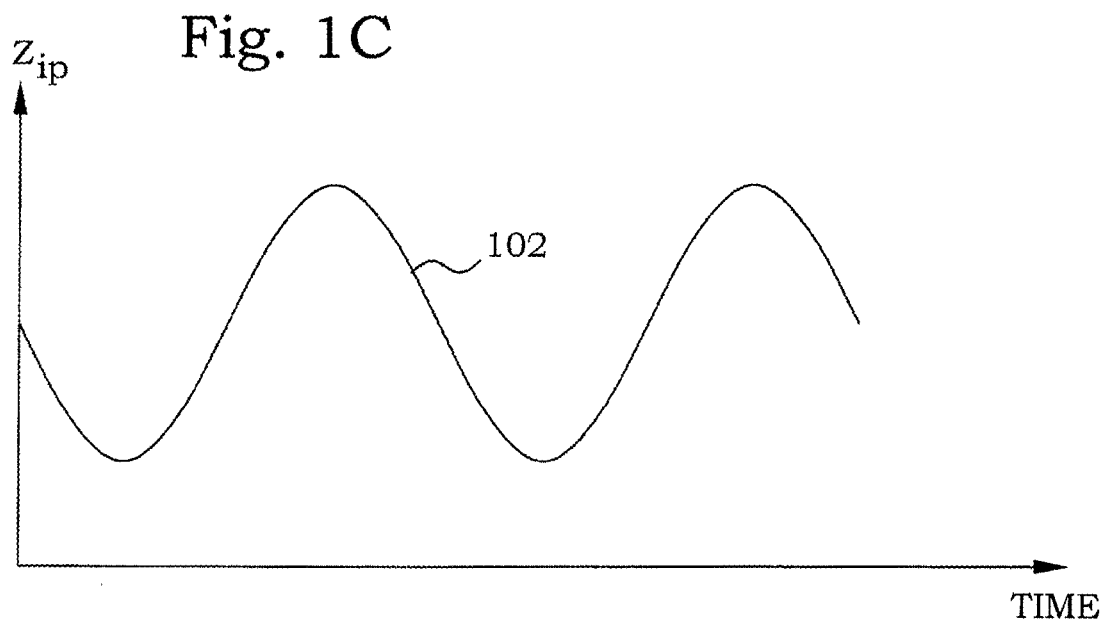
FIG. 1C is a diagram illustrating the Z component of the movement of a moved-body interaction portion without any normal force.

In FIG. 1C, a diagram illustrating an embodiment periodic behaviour of the Z-direction component 102 along the closed loop path is illustrated, when the vibration body 30 is operating without any normal force, i.e. without any contacts with any body to be moved. The top parts of the curve corresponds to phases where there is a positive X motion component and the bottom parts of the curve corresponds to phases where there is a negative X motion component. It is therefore requested to use the Z-direction motion to contact and remove the contact, respectively, to the body to be moved.

Typically, the applied voltages can also be provided to give a closed loop path in the opposite direction.

Figure 2A:
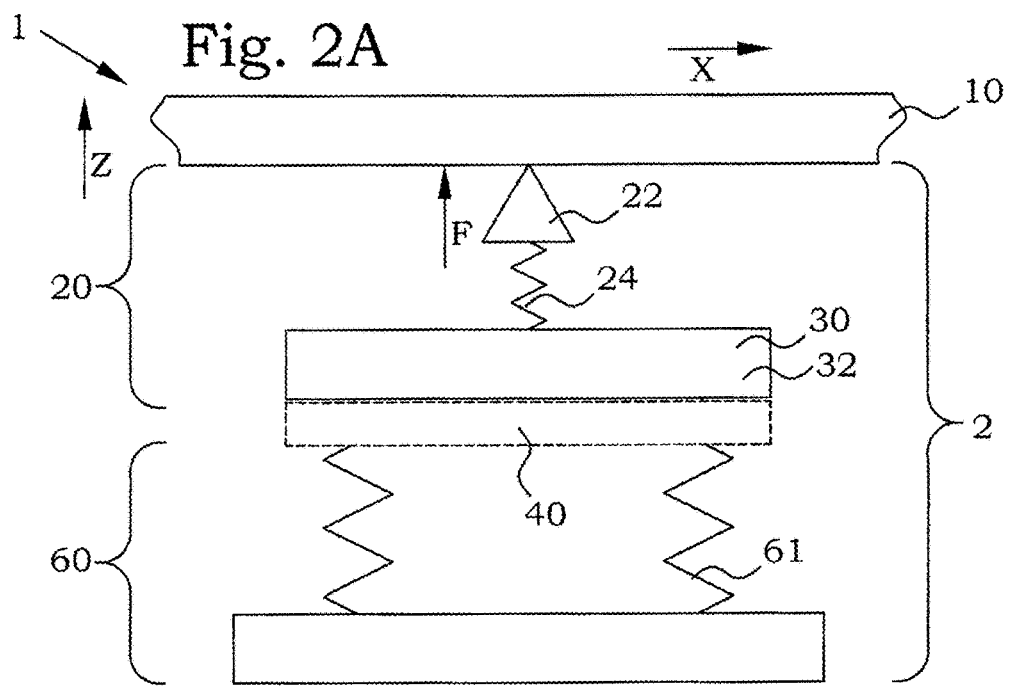
FIG. 2A is a schematic illustration of an embodiment of an electromechanical stator.

As mentioned above, in order to transform the motion of the moved-body interaction portion 22 into a displacement of the body to be moved, the moved-body interaction portion 22 has to mechanically interact with the body to be moved. FIG. 2A illustrates schematically an electromechanical stator 2 of an electromechanical motor 1. The actuator section 20 is pressed against the body 10 to be moved with a normal force F, applied by a spring section 60. The force F is applied essentially perpendicular to the motion direction, which is the explanation of the name. A support section 40 may be present as a bridge between the actuator section 20 and the spring section 60. The total resilience 61 of the spring section 60, and optionally also the support section 40, is indicated by a spring-like part in the figure.

If a low-frequency alternating voltage is applied to the vibration body 30, the spring section 60 will compensate for the achieved vibrations. The moved-body interaction portion 22 will be in constant mechanical contact with the body 10 to be moved. This results in that the entire electromechanical stator 2 will just slowly vibrate without causing any movements at all. However, if the frequency of the provided alternating voltage is increased, the inertia of the system will start to play an important role. When the vibration of the vibration body 30 causes the moved-body interaction portion 22 to move in the negative Z-direction, i.e. away from the body 10 to be moved, the inertia of the electromechanical stator 2 will prevent the spring section 60 to compensate the motion immediately. The result is that the moved-body interaction portion 22 leaves the mechanical contact with the body 10 to be moved for a short period of time. During this time, the moved-body interaction portion 22 can freely move e.g. in the negative X direction without interfering with the body 10 to be moved. In other words, the moved-body interaction portion 22 can be reset and prepare for a new contact with the body 10 to be moved without having any mechanical contact with the body to be moved.

Figure 2B:
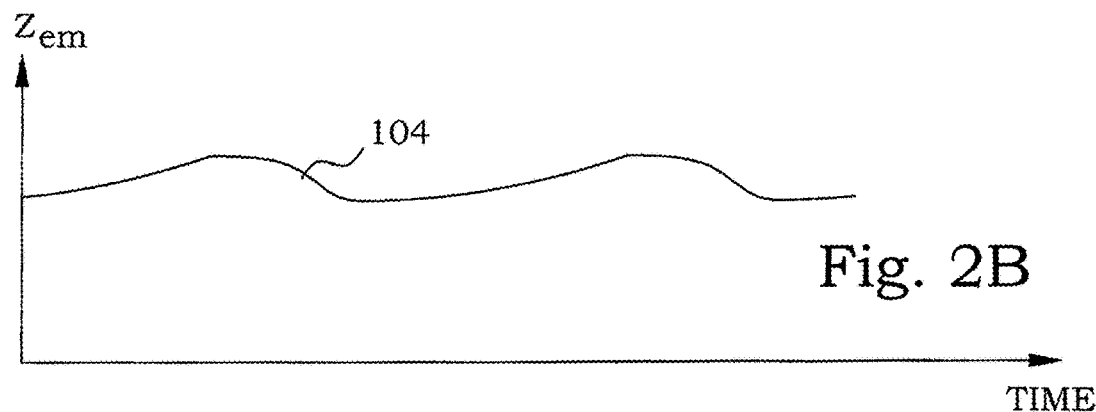
FIG. 2B is a diagram illustrating the Z movement of a frame support point of the electromechanical motor during operation.

FIG. 2B is a schematic diagram illustrating a movement 104 of a Z direction position $z_{em}$ of a connection point between the spring section 60 (or support section 40) and the actuator section 20. This connection point is in the following referred to as the frame support point. When the contact between the moved-body interaction portion 22 and the body 10 to be moved is removed, the normal force provided by the spring section 60 will start to move the actuator section 20 towards the body 10 to be moved. The inertia of the system will give this motion a much longer time constant than the vibrations of the actuator section 20. The motion of the above mentioned connection point will continue until the moved-body interaction portion 22 again meets the body 10 to be moved, which typically occurs when the vibration of the actuator section 20 moves the moved-body interaction portion 22 towards the body 10 to be moved again. The frame support point will then be pushed back again, typically to the original position. The stroke of this movement depends on the size of the normal force, the mass of the moving parts and the frequency of the actuator section 20 vibrations.

Figure 2C:
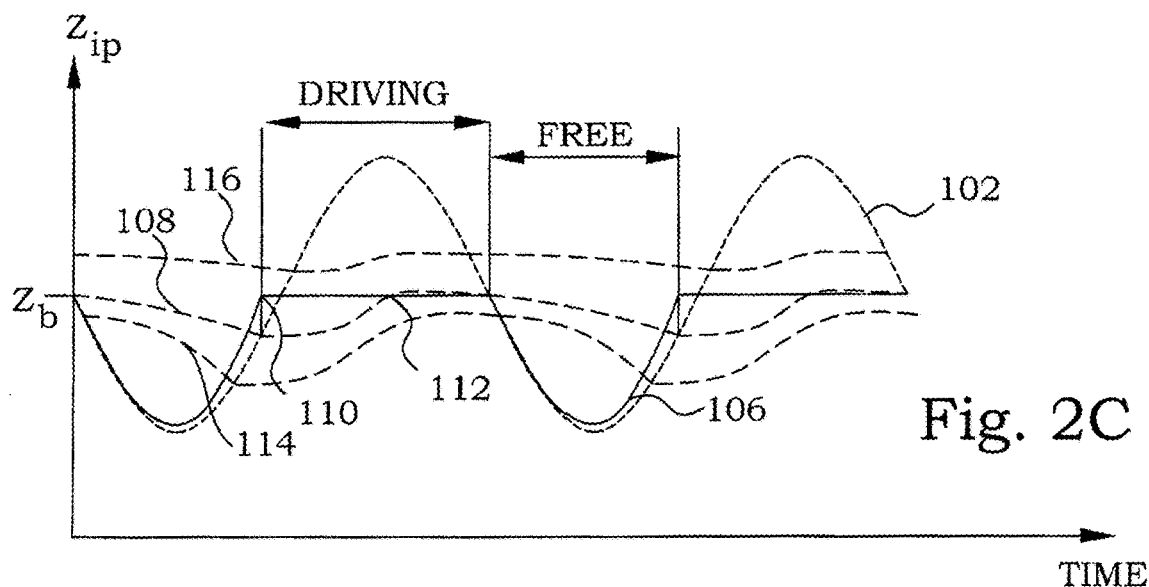
FIG. 2C is a diagram illustrating the Z movement of the moved-body interaction portion during operation.

FIG. 2C is a schematic diagram illustrating the position 106 in Z direction of the tip of the moved-body interaction portion 22 during operation. The diagram starts at the time when the actuator section 20 pulls the moved-body interaction portion 22 away from the body 10 to be moved. The moved-body interaction portion 22 performs the bottom part of the closed loop, c.f. FIG. 1C, however corrected by the movement of the frame support point. In the meantime, the frame support point is slowly moved in the positive Z direction, as indicated by the dotted line 108. Since such a movement results in bringing the moved-body interaction portion 22 and frame support points closer, the dotted line 108 corresponds to the negative frame support point movement. These motions continues until the moved-body interaction portion 22 again reaches the body 10 to be moved at the point 110, which corresponds to the point where the curve 102 and the negative correspondence of curve 104, i.e. curve 108, meet. In other words, $z_{ip}$ equals the position $z_b$ of the surface of the body 10 to be moved. The contact with the body 10 to be moved prohibits any further motion in the Z direction of the moved-body interaction portion 22 and during the remaining part of the period, only the frame support point slowly returns to the original position again, by action of the force applied in the Z direction by the actuator section 20, which is illustrated by the curve section 112. The process then starts all over again.

It can now be understood that the relation between the time constants of the two motions, i.e. the actuator section 20 vibration as illustrated by the curve 102 and the movement 104 of the frame support point, plays an important role for the operation of the motor. If the time constant of the frame support point movement 104 decreases relative to the time constant of the actuator section 20 vibration, i.e. the motion of the frame support point is relatively faster, the time period during which the moved-body interaction portion 22 is free from contact with the body 10 to be moved is reduced. This is schematically illustrated by the dotted curve 114. This means that the moved-body interaction portion 22 may be in contact with the body 10 to be moved also during phases of the vibration when there is a non-negligible motion component in the negative X direction. This in turn reduces the speed and increases the wear.

Likewise, if the time constant of the frame support point movement 104 increases relative to the time constant of the actuator section 20 vibration, i.e. the motion of the frame support point is relatively slower, the time period during which the moved-body interaction portion 22 is in contact with the body 10 to be moved is reduced. This is schematically illustrated by the dotted curve 116. This means that the moved-body interaction portion 22 may influence the body 10 to be moved during a shorter period of time, which in turn reduces the available speed. Furthermore, also the available force in the X direction movement is reduced.

In order to optimize the operation of the motor, the applied normal force is preferably adapted to fit properly to the operation frequency and to the different masses of the different parts of the motor. There is thus requested that the spring section has well-defined and easy controllable elasticity properties. At the same time, since the typical ultrasonic electromechanical motors are applied in miniature applications, such spring sections have to be provided within a limited space and preferably requesting as few mounting steps as possible.

According to the technology presented in the present disclosure, a continuous sheet of elastic material can be used as a basic part for an actuator section, a support section as well as for a spring section. This minimizes required mounting efforts and increases a mounting accuracy. At the same time, just by appropriate designing the shape of the continuous sheet of elastic material, appropriate properties of the different sections can be achieved. A well controllable normal force can easily be achieved in a direction transverse to the main plane of the continuous sheet of elastic material.

In one embodiment, an electromechanical stator comprises an actuator section, a support section and a spring section. A continuous sheet of elastic material constitutes at least a part of the actuator section, at least a part of the support section and at least a part of the spring section. The actuator section comprises a vibration assembly in turn comprising at least one vibration body and a moved-body interaction portion. The vibration body comprises an electromechanical volume attached to a part of the continuous sheet of elastic material. The vibration body is arranged for causing bending vibrations, in a vibration direction transverse to the plane of the continuous sheet of elastic material, when alternating voltages are applied to the electromechanical volume. The support section is attached between the actuator section and the spring section. The support section is connected with at least one fixation point via the spring section. The spring section is elastic, with a spring constant, regarding displacements, in the vibration direction, of the fixation point relative to a connection point between the spring section and the support section, thereby enabling provision of a normal force in the vibration direction on the moved-body interaction portion upon displacement of the fixation point in the vibration direction.

Figure 3A:
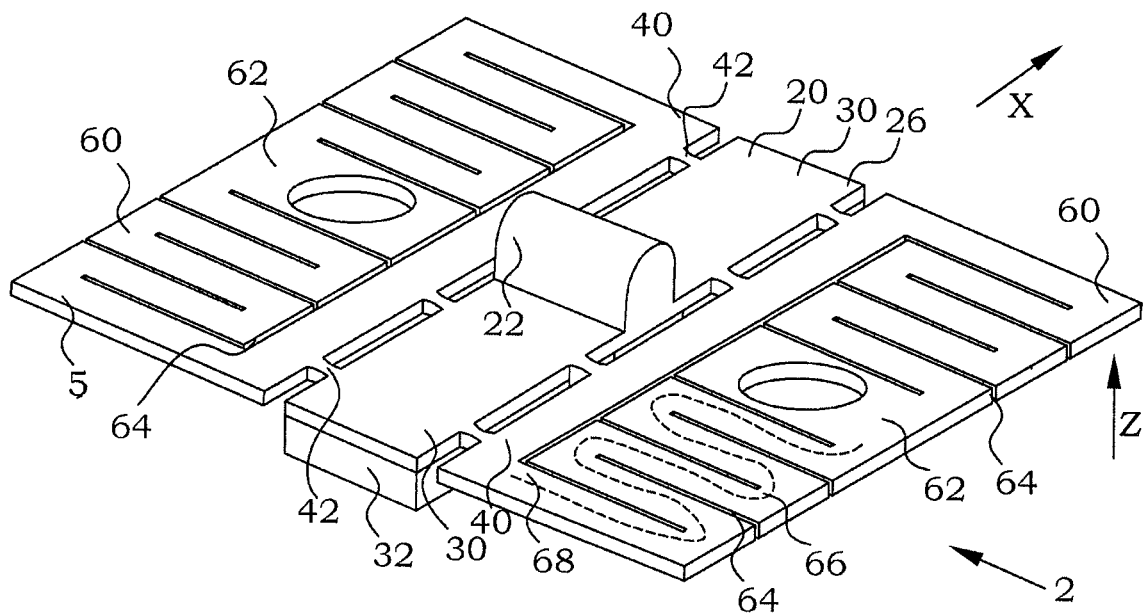
FIG. 3A is an elevational view of an embodiment of an electromechanical stator in a non-elastically-deformed condition.

FIG. 3A illustrates one embodiment of an electromechanical stator 2. The electromechanical stator 2 comprises an actuator section 20, at least one support section 40 and at least one spring section 60. In this embodiment, the electromechanical stator 2 comprises two support sections 40 and two spring sections 60, provided on opposite sides of the actuator section 20. A continuous sheet of elastic material 5 constitutes at least a part of the actuator section 20, at least a part of the support sections 40 and at least a part of the spring sections 60.

The actuator section 20 comprises a vibration assembly 26 in turn comprising at least one vibration body 30 and a moved-body interaction portion 22. In this embodiment, the vibration assembly 26 comprises two vibration bodies 30, interconnected by the moved-body interaction portion 22. The vibration bodies 30 each comprises an electromechanical volume 32 attached to a part of the continuous sheet of elastic material 5. The vibration bodies 30 are arranged for causing bending vibrations, in a vibration direction Z transverse to the plane of the continuous sheet of elastic material 5, when alternating voltages are applied to the respective electromechanical volumes 32. The actuator section 20 is connected to the support sections 40 on its sides by attachment members 42.

The part of the continuous sheet of elastic material 5 that constitutes the spring section 60 is elastic concerning movements in the Z direction. In a state free from elastic deformation, i.e. where the continuous sheet of elastic material 5 of the spring section 60 is not exposed for any elastic displacements in the Z direction, the continuous sheet of elastic material 5 of the spring section 60 is flat. Such a situation is illustrated in FIG. 3A.

Each support section 40 is attached between the actuator section 20 and a respective spring section 60. The aim of the support section 40 is to decouple any motions, in particular rotational motions, induced by the actuator section 20, from being transferred into the spring section 60. The actuator section 20 performs bending vibrations, which typically cause the attachment members 42 to twist or rotate. However, since the twisting properties of the main support section 40 is far less admitting, any rotation motions, mainly around an axis within the continuous sheet of elastic material 5, of the attachment members 42 will not be transferred over to the spring section 60. Therefore, the support section 40 is preferably adapted for at least partially prohibiting rotational movements of the actuator section 20 to propagate to the spring section 60.

Figure 3B:
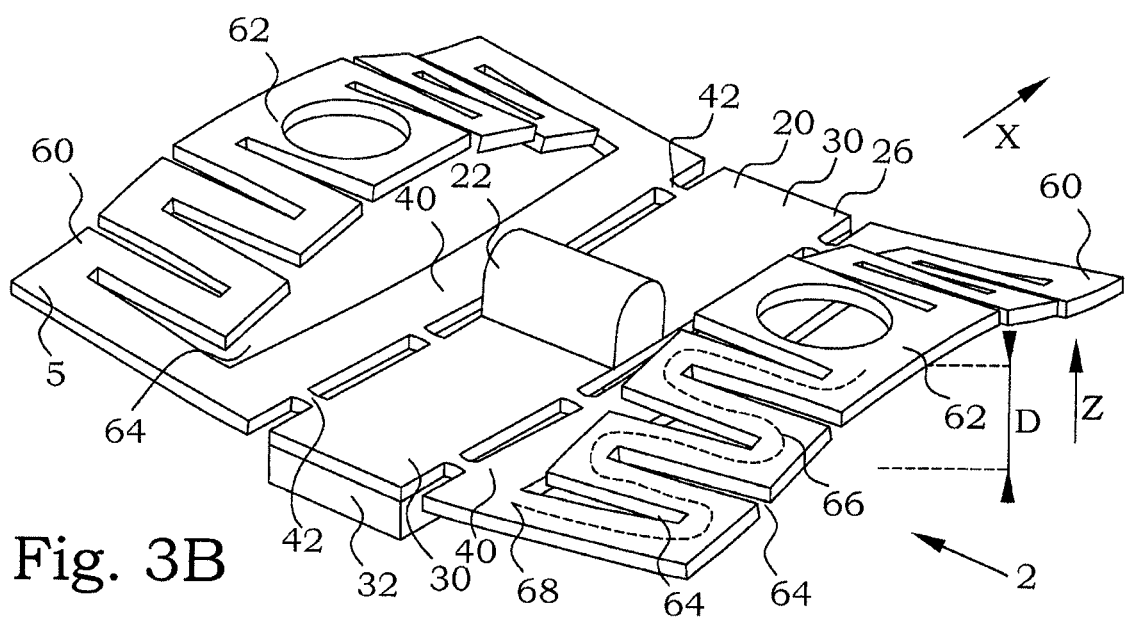
FIG. 3B is an elevational view of the embodiment of FIG. 3A when being elastically deformed.

The spring sections 60 connect a respective support section 40 with at least one fixation point 62. Each spring section 60 is elastic, with a spring constant, regarding displacements of the fixation point 62 in the vibration direction Z relative to a connection point between the spring section 60 and the support section 40. This elasticity thereby enabling provision of a not mal force in the vibration direction Z on the moved-body interaction portion 22 upon displacement of the fixation point 62 in the vibration direction Z. FIG. 3B illustrates such a situation, when the fixation point 62 has been displaced a distance D causing an elastic deformation of the continuous sheet of elastic material 5 of the spring section 60 resulting in that the actuator section 20 and in particular the moved-body interaction portion 22 is pushed upwards in the figure with a force that will be used as the normal force when mounted in a motor. FIG. 3A thus illustrates the embodiment of an electromechanical stator in a state before mounting it in an electromechanical motor, while FIG. 3B illustrates the same embodiment in a condition similar to what it looks like when it is mounted in an electromechanical motor.

The actuator section 20 will typically expose the attachment members 42 for different kinds of vibrations. It is preferred if at least the high-frequency parts of these vibrations are not propagating the whole way to the fixation points 62. Due to the fundamentally differing geometrical dimensions of the supporting section 40 compared to the attachment members 42, a large portion of the vibration energy provided to the attachment members 42 will be reflected back to the actuator section 20. Furthermore, due to the fact that the spring section 60 and the support section 40 together has a relatively high inertia, the elastic behaviour of the spring section 60 will also give rise to a low-pass filter action. In other words, the support section 40 and the spring section 60 together constitutes a low-pass filter of vibrations between the actuator section 20 and said fixation point 62.

Figure 8A:
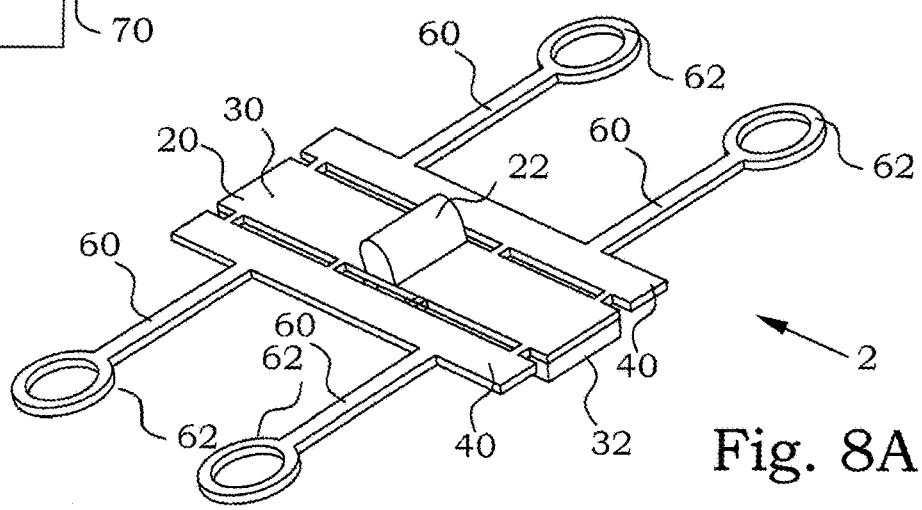
FIG. 8A is an elevational view of another embodiment of an electromechanical stator.

In this particular embodiment, the continuous sheet of elastic material 5 of the spring section 60 has a pattern of cuts 64. These cuts 64 removes the direct paths through the continuous sheet of elastic material 5 from the support section 40 to the fixation point 62, which means that the efficient length of a path 66 from the support section 40 to the fixation point 62 becomes much longer. Since the elastic properties of the spring section 60 is dependent, among other parameters, on such a length, the spring constant of the spring section 60 can be reduced without extending the spring section 60 laterally. C.f. FIG. 8A further below. In other words, the cuts 64 provide at least one limited path 66 between connection points 68 to the support section 40 and the fixation point 62. In the present embodiment, this at least one limited path 66 is curved.

Furthermore, the limited path 66 created by the cuts 64 has also typically a smaller width, at least in comparison with paths through the supporting section 40. In other words, at least one limited path 66 has a smaller average cross-section area than an average cross-section along a closest path between the connection points 68 between the spring section 60 and the support section 40 and the attachment members 42 between the actuator section 20 and the support section 40. A smaller width, or rather a smaller cross-section is typically associated with a lower spring constant. This results in that the spring section 60 becomes the dominating part in determining the overall spring properties of the electromechanical stator 2.

The continuous sheet of elastic material is in a typical embodiment a flat metal sheet. However, there are also other possible designs and/or compositions of the continuous sheet of elastic material.

In one embodiment, the continuous sheet of elastic material has an essentially homogeneous composition throughout the sheet. In other words, one and the same material forms the entire sheet.

In another embodiment, the continuous sheet of elastic material changes its composition over the sheet area. This may be provided e.g. by using materials having a chemical gradient over the sheet area, or by applying different treatments, e.g. hardening or coatings, on different parts of the sheet. In such a way, the material properties may be somewhat adapted for the different sections. A more rigid material may e.g. be useful in the support section in certain applications. A softer material may instead be beneficial in the spring section, depending on the technical fields of application.

However, in order to achieve some of the benefits of the continuous sheet of elastic material, the continuous sheet of elastic material should be provided in one permanently joined piece. Gradients or other changed properties may in certain embodiments be provided by starting out from separate pieces that then are unified into one piece by an irreversible joint. In other embodiments, gradients or changed properties may be achieved in an initially homogeneous material. In further embodiments, gradients or changed properties in the continuous sheet of elastic material may be provided in connection with the manufacturing of the material itself.

Figure 4:
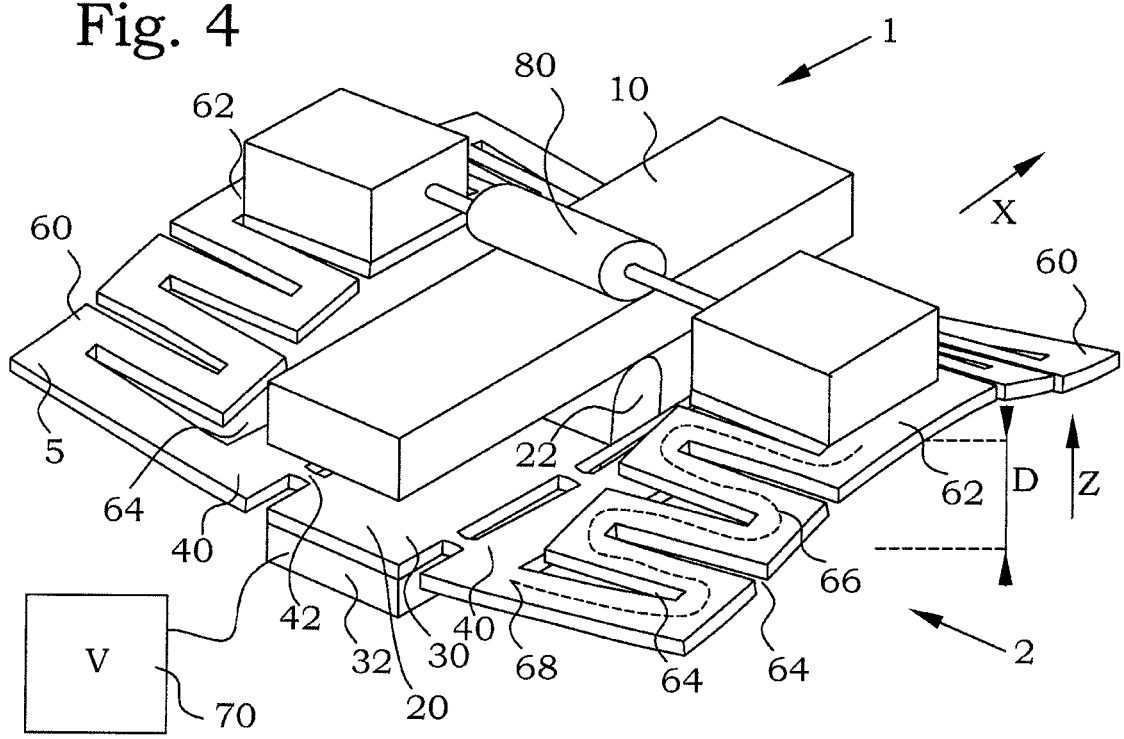
FIG. 4 is an elevational and partly schematic view of an embodiment of an electromechanical motor.

The electromechanical stator 2 is intended to be incorporated in an electromechanical motor. FIG. 4 illustrates an embodiment of an electromechanical motor 1 having an electromechanical stator according to the embodiment of FIG. 3A-B. The electromechanical motor 1 further comprises a body 10 to be moved and a voltage supply 70 arranged to supply alternating voltages to the electromechanical volume 32 of the vibration bodies 30. This particular embodiment also comprises a bearing arrangement 80, which defines the position of the fixation point 62 relative to the body 10 to be moved. Note that the drawings typically are enlarged compared to the actual size. A typical size of an electromechanical motor of this kind is a few millimetres.

Figure 5:
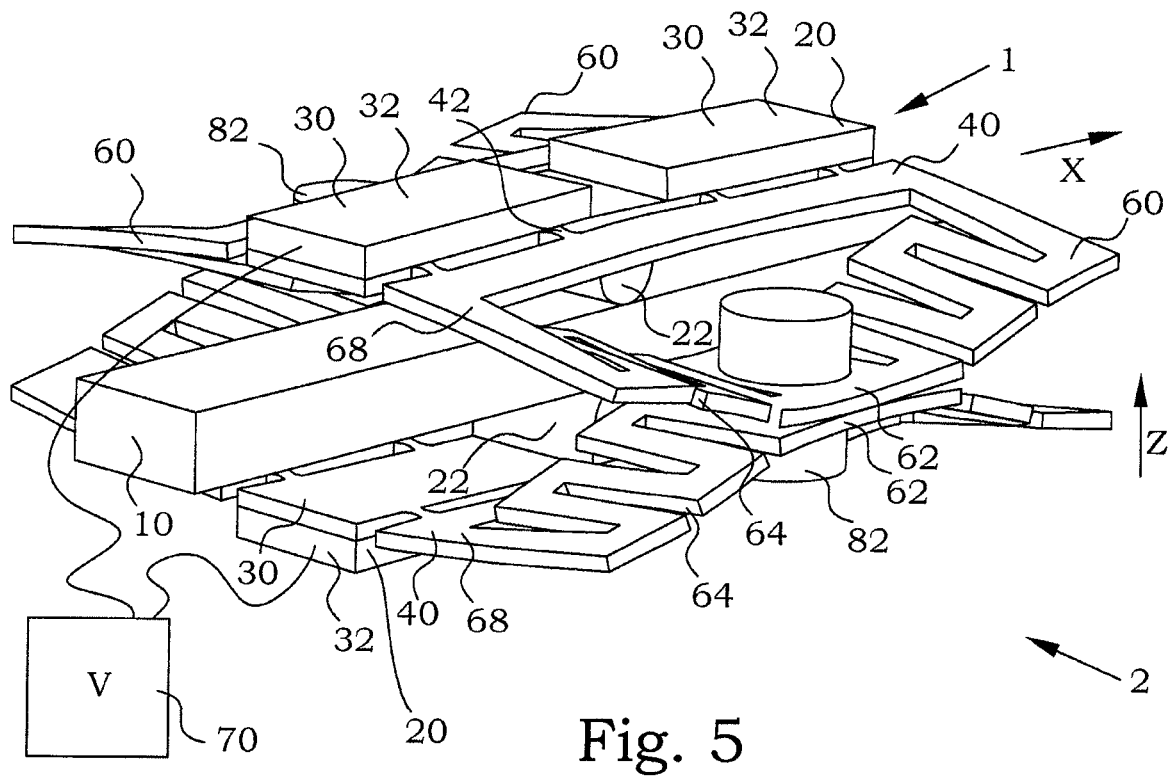
FIG. 5 is an elevational and partly schematic view of an embodiment of an electromechanical motor having twin electromechanical stators.

FIG. 5 illustrates another embodiment of an electromechanical motor 1, where two electromechanical stators 2 according to the FIGS. 3A-B are mounted in a twin design on opposite sides of the body 10 to be moved. By attaching the fixation points 62 of the two electromechanical stators 2 to each other by fixation means 82, possibly via a distance element, the need for any bearing arrangement vanishes. Instead, the two electromechanical stators 2 can be operated synchronized with each other. The fixation means 82 can be of any kind providing a temporary or permanent mechanical connection. Typical examples are screws or rivets. However, fixation means 82 constituted by e.g. spot welding or gluing are also possible to use, depending on the application.

The actual operation of an electromechanical motor according to the basic consideration above is a very complex process, in which forces, inertia, frequencies, resonance properties etc. influences the final performance. In order to increase the understanding of the roles of the different quantities, a simplified model system can be analysed during the very first half cycle of electromechanical excitation. The first half cycle can be divided into three phases; a pre-loaded start condition, the initial snatch of the moved-body interaction portion from the body to be moved, and the very first free moving phase of the moved-body interaction portion.

Figure 6A:
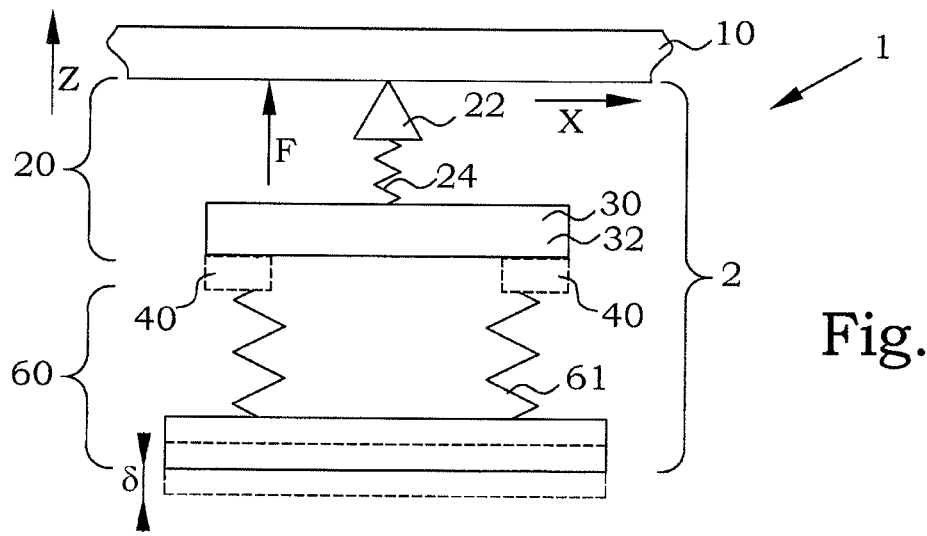
FIGS. 6A-6C are schematic drawings of an electromechanical motor during the first stages of an operation.

FIG. 6A illustrates schematically the situation at the pre-loaded start condition. The moved-body interaction portion 22 is in mechanical contact with the body 10 to be moved with pre-load force F. This pre-load force is achieved by a certain displacement $\delta_{sp}$ of the fixation points relative to the body 10 to be moved and thereby relative to the top of the moved-body interaction portion 22. The relation between displacement $\delta_{sp}$ and pre-load force F is expressed as:

$$F = c_{sp} \cdot \delta_{sp} \quad (1)$$

where $c_{sp}$ is the spring constant of said spring section.

Figure 6B:
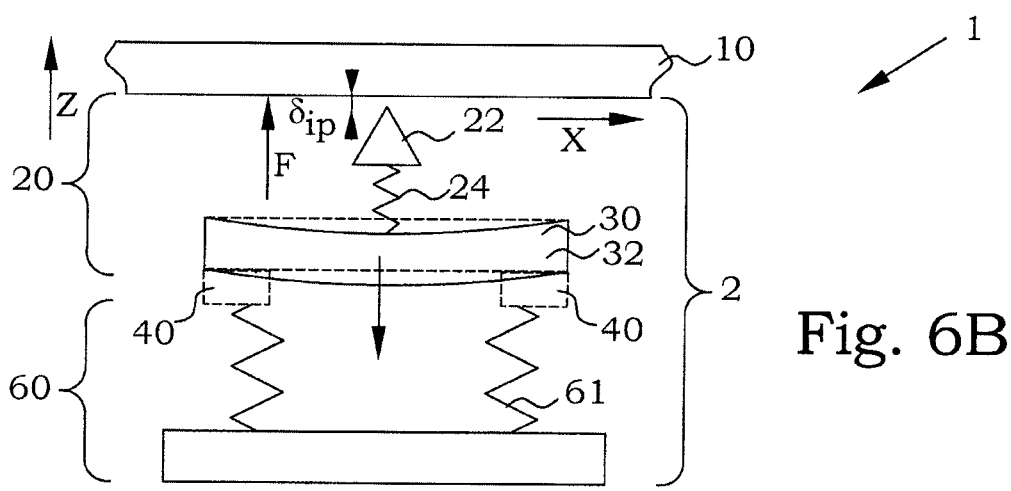

FIG. 6B illustrates schematically the situation initial snatch of the moved-body interaction portion 22 from the body 10 to be moved. The pre-load force causes the stator, and in particular the spring section, to elastically deform. If such a pre-load force is momentarily released, the stator will start to vibrate with a motion that is composed of a set of natural resonance mode components. The dominating natural resonance mode in the direction of the pre-load is here denoted as the primary natural resonance mode $f_{sp}$. In order to be able to remove the contact of the moved-body interaction portion 22, the operation frequency $f_o$ of the voltages provided to the electromechanical volumes should at least be above the primary natural resonance frequency $f_{sp}$ of the entire electromechanical stator 2. In other words, in one embodiment of an electromechanical motor, the voltage supply is arranged to supply the alternating voltages at an operation frequency $f_o$ at least above a primary natural resonance frequency $f_{sp}$ of the entire electromechanical stator.

The natural resonance frequencies of the electromechanical stator 2, as for all other mechanical systems, depend on e.g. whether or not the part is pre-loaded or whether motion restrictions may occur. A free moving phase of the moved-body interaction portion resembles a free vibrating electromechanical stator with a prescribed initial condition. The primary natural resonance frequency for the entire electromechanical stator can be expressed as:

$$f_{sp} = \frac{1}{2\pi} \cdot \sqrt{\frac{c_{sp}}{m_{eq}}}, \quad (2)$$

where $m_{eq}$ is an equivalent lumped mass of the mass-spring representation of the electromechanical stator.

The analysis of the initial snatch can be brought further. If the operation frequency $f_o$ is used, the motion, represented by the distance in Z direction $z_{ip}$ of the moved-body interaction portion 22, can be expressed as:

$$z_{ip} = \delta_{ip} \cdot \sin(2\pi f_o t),$$

where $\delta_{ip}$ is an amplitude of the stroke of the tip of the moved-body interaction portion 22.

The maximum acceleration then becomes:

$$a_{ip} = \delta_{ip} \cdot (2\pi f_o)^2,$$

and the time for performing a half cycle, which approximately is close to the time during which the moved-body interaction portion 22 is free from contact is:

$$t_{1/2} = \frac{1}{2f_o}. \quad (3)$$

Figure 6C:
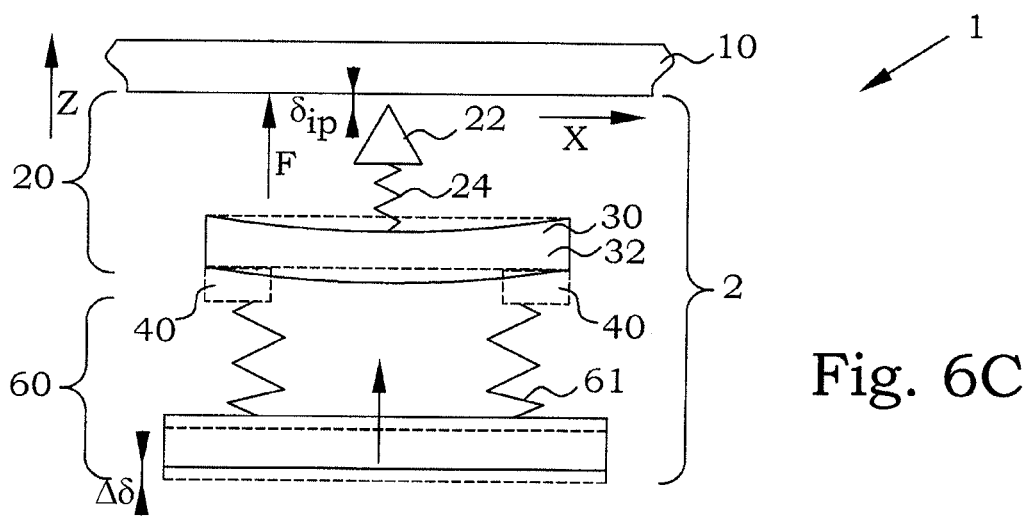

FIG. 6C illustrates schematically the very first free moving phase of the moved-body interaction portion 22. During this phase, the spring section 60 acts to push the moved-body interaction portion 22 back towards the body 10 to be moved. The distance of this pushing back can be denoted as $\Delta\delta_{sp}$, and is controlled by the primary natural resonance frequency of the electromechanical stator. The distance can be approximated as:

$$\Delta\delta_{sp} = \delta_{sp}(1 - \cos(2\pi f_{sp} t)).$$

The maximum acceleration then becomes:

$$a_{sp} = \delta_{sp} \cdot (2\pi f_{sp})^2.$$

The maximum push-back distance $\Delta\delta_{max}$ is reached after approximately half a cycle, which gives:

$$\Delta\delta_{max} = \delta_{sp}(1 - \cos(2\pi f_{sp} t_{1/2})) = \delta_{sp}\left(1 - \cos\left(\pi \frac{f_{sp}}{f_o}\right)\right). \quad (4)$$

By assuming that the maximum push-back distance $\Delta\delta_{max}$ is small compared to $\delta_{ip}$:

$$\Delta\delta_{max} = \xi \cdot \delta_{ip},$$

where $\xi$ is a small number, the expression (4) can be approximated by the two first terms of a Taylor series. Combining relations (1), (2) and (4), then gives an estimate of the operation frequency:

$$f_o = \sqrt{\frac{F}{8\xi\delta_{ip}m_{eq}}} \qquad (5)$$

For achieving a good operation, the maximum push-back distance $\Delta\delta_{max}$ should preferably be considerably smaller than the distance $\delta_{ip}$, preferably less than 10% of the distance $\delta_{ip}$, i.e. $\xi$ should preferably be less than 0.1. The pre-load force F may in many typical applications be in the order of magnitude of 20N. A typical maximum distance $\delta_{ip}$ between the moved-body interaction portion 22 and the body 10 to be moved may be in the range of 5 μm during the free moving phase. A typical equivalent lumped mass of an electromechanical stator may be in the range of 0.5 g. Such assumptions would together point to an operation frequency of about 100 kHz, which is fully feasible.

The acceleration $a_{sp}$ of the electromechanical stator should also be considerably lower than the acceleration $a_{ip}$ of the moved-body interaction portion 22, preferably less than 10% the acceleration $a_{ip}$.

It is also possible to express the ratio between the primary natural resonance frequency $f_{sp}$ and the preferred operation frequency $f_o$:

$$\frac{f_o}{f_{sp}} = \sqrt{\frac{\pi^2 \cdot \delta_{sp}}{2 \cdot \Delta\delta_{max}}} \qquad (6)$$

If a maximum push-back distance $\Delta\delta_{max}$ of 0.5 μm and a displacement $\delta_{sp}$ of 1 mm is assumed, this would require a frequency ratio of about 100. These conditions will be rather different for different kinds of motors and applications and the preferred frequency ratio may therefore also vary substantially.

In a general context, however, the operational frequency $f_o$ should preferably exceed the primary natural resonance frequency $f_{sp}$ by at least a factor of 5, more preferably by at least a factor of 10 and most preferably by at least a factor of 30.

The analysis above is made for the very first moments of an operation. However, the model involves an assumed "continuous" sinusoidal motion. This means that the initial velocity is "assumed" to be non-zero. Such imperfections in the model may give rise to e.g. minor delays or time shifts in the analysis. However, the conditions of a steady-state operation is assumed not to be very different from what has been used as the model above. The recovery of the pushing back distance may perhaps not lead to exactly the same starting position, but the main reasoning will anyway be valid at least within an order of magnitude.

The operation frequency $f_o$ is typically selected also to fit to the vibration properties of the vibration assembly, e.g. to be situated close to resonance frequencies of the vibration assembly. Suitable masses, spring constants and displacements of the spring section can then be found in order to fulfil the above estimations for an appropriate operation.

One advantage of using a continuous sheet of elastic material as a spring section is that spring constants of narrow material portions of beam shapes are relatively easy to estimate and predict. For instance, in the embodiments of FIGS. 3A-B, the spring portions can be considered as being composed by serially connected straight beams and curved portions, having spring constant contributions that are relatively easy to estimate analytically and/or by simulations. In general, a longer path through the spring section between the connection points between the spring section and the support section and the attachment members between the actuator section and the support section gives a lower spring constant of the spring section. By using meandering shapes, very long paths can be achieved within a limited space. Likewise, if the width of the path is reduced, the spring constant will also decrease.

The use of a common continuous sheet of elastic material for all the active parts of the stator ensures a reliable geometric relation between the different parts of the stator. No uncontrolled displacements or bendings from additional mounting components influences the normal force application and the finally achieved normal force can be estimated very accurately from just the shape and elastic deformation distance of the spring section.

Figure 7:
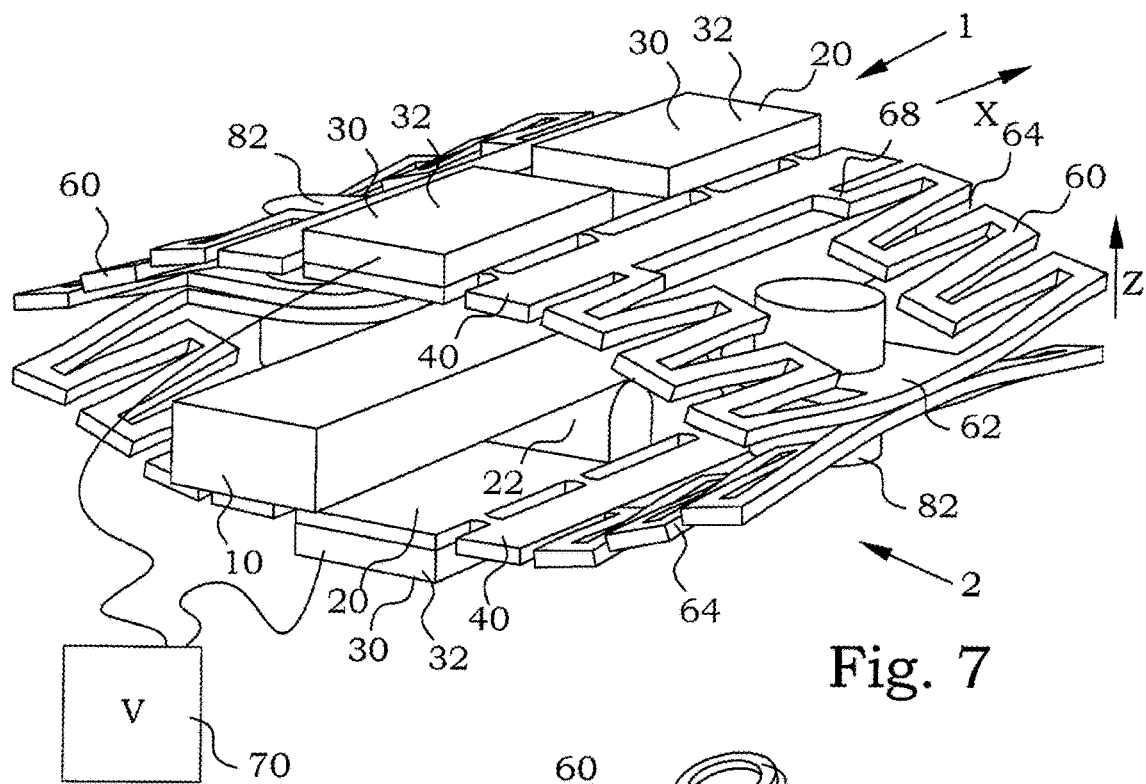
FIG. 7 is an elevational and partly schematic view of another embodiment of an electromechanical motor having twin electromechanical stators.

Many different detailed designs of the spring section are possible to use. FIG. 7 illustrates another embodiment of an electromechanical motor 1. Here the meandering is provided in a direction perpendicular to the meanderings of FIGS. 3A-B.

FIGS. 8A-F illustrate other examples of embodiments of spring section patterns, using the ideas of utilizing curved narrow material paths cut out in the continuous sheet of elastic material through the spring section. FIG. 8A illustrates an electromechanical stator 2 having four spring sections 60, extending perpendicular from the support section 40. This can be thought of as a straightening out of the earlier presented curved spring shapes. The spring properties of such a design are very easy to calculate, using standard beam vibration models. However, this embodiment requires that there is plenty of available space on both sides of the actuator section.

Figure 8B:
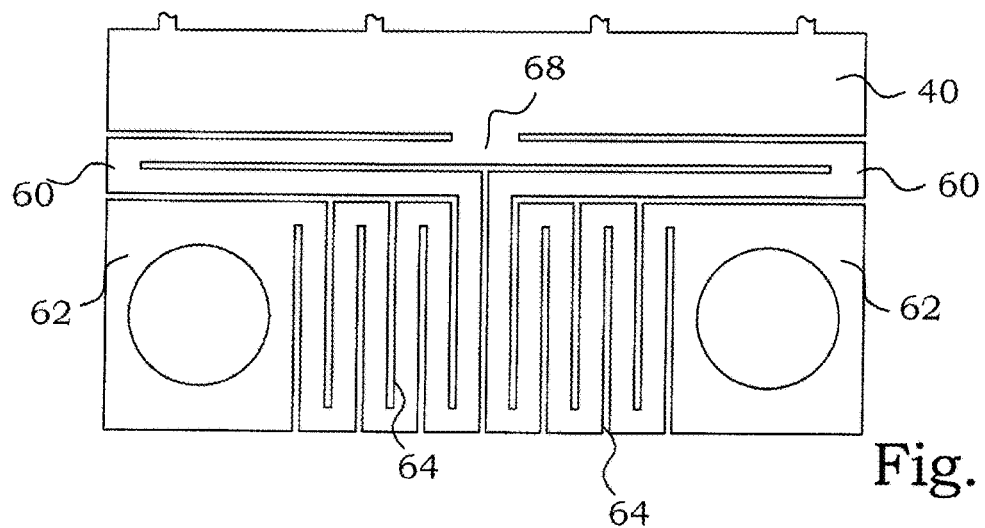
FIGS. 8B-E are views from above of parts of embodiments of electromechanical stators.

FIG. 8B illustrates a spring section 60 having two fixation points 62, but only one connection 68 to the support section 40. This ensures that the normal force is applied in the middle of the support section 40, and may be advantageous in applications where any allowed tilting around an axis perpendicular to the motion direction has to be limited.

Figure 8C:
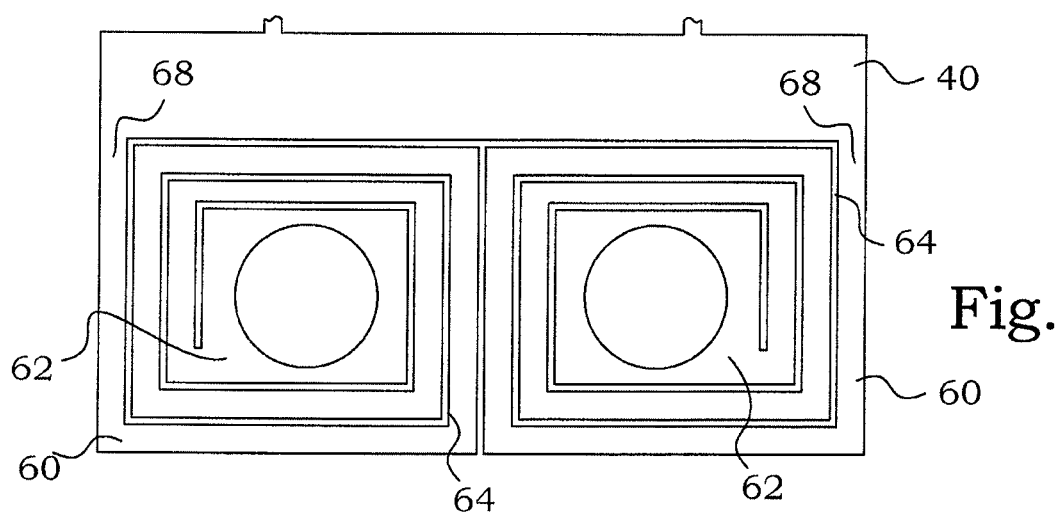

In FIG. 8C, one support section 40 is connected to two separated spring sections 60, each of which having its own fixation point 62. Here the path between the connections 68 and the fixation points has a basically spiral shape.

Figure 8D:
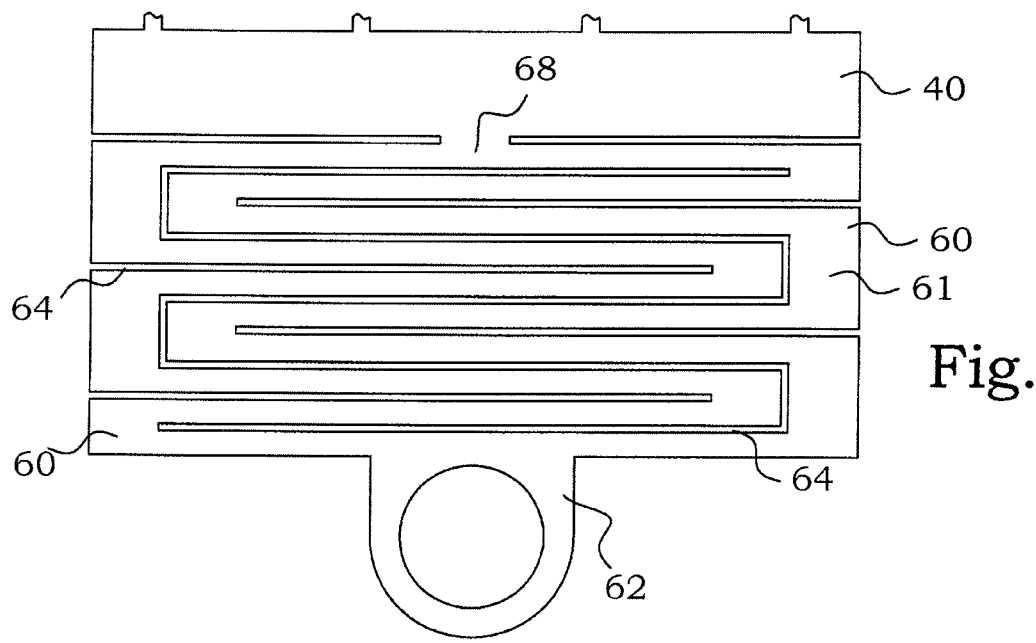

In FIG. 8D, the width at the bends 61 of the meandering shapes of the spring section 60 are made larger in order to strengthen the structure at points where fatigue sometimes may occur.

Figure 8E:
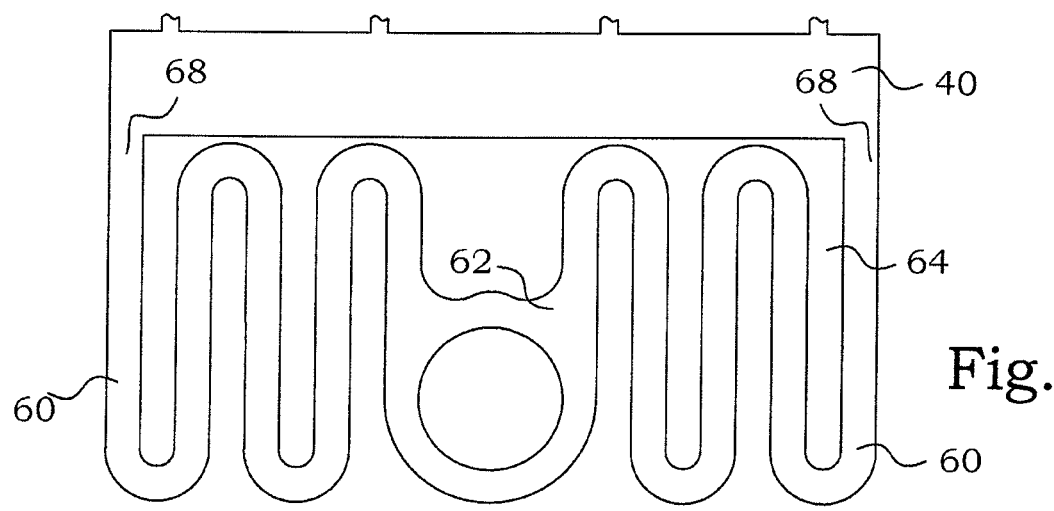

FIG. 8E, illustrates a spring section 60 where all bends have large radii of curvature. This avoids sharp corners, where crack initiation may be a problem.

Figure 8F:
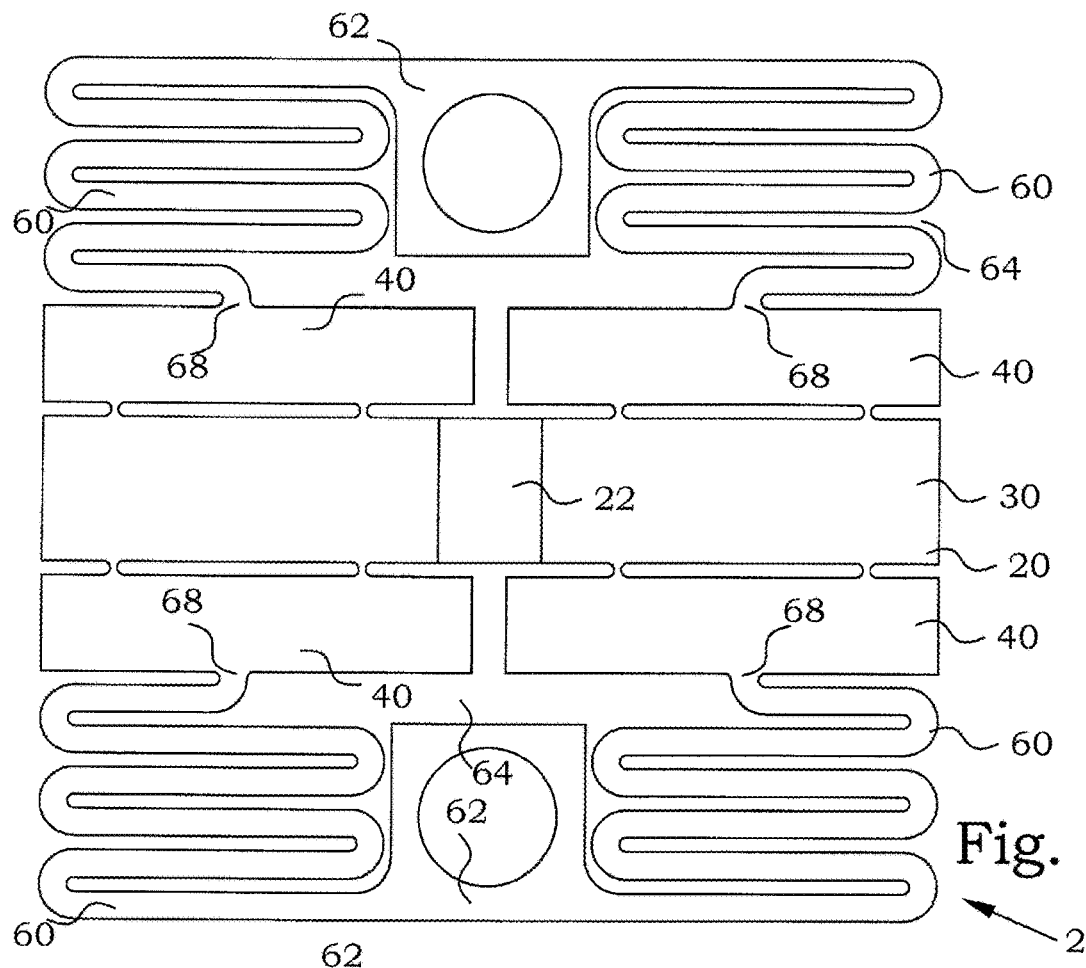
FIGS. 8F-H are views from above of other embodiments of electromechanical stators.

FIG. 8F illustrates an embodiment having two support sections 40 on each side of the actuator section 20. This makes it possible to adapt the spring force applied at the different support sections 40, e.g. for compensating unevenly applied load forces on the moved-body interaction portion 22.

Figure 8G:
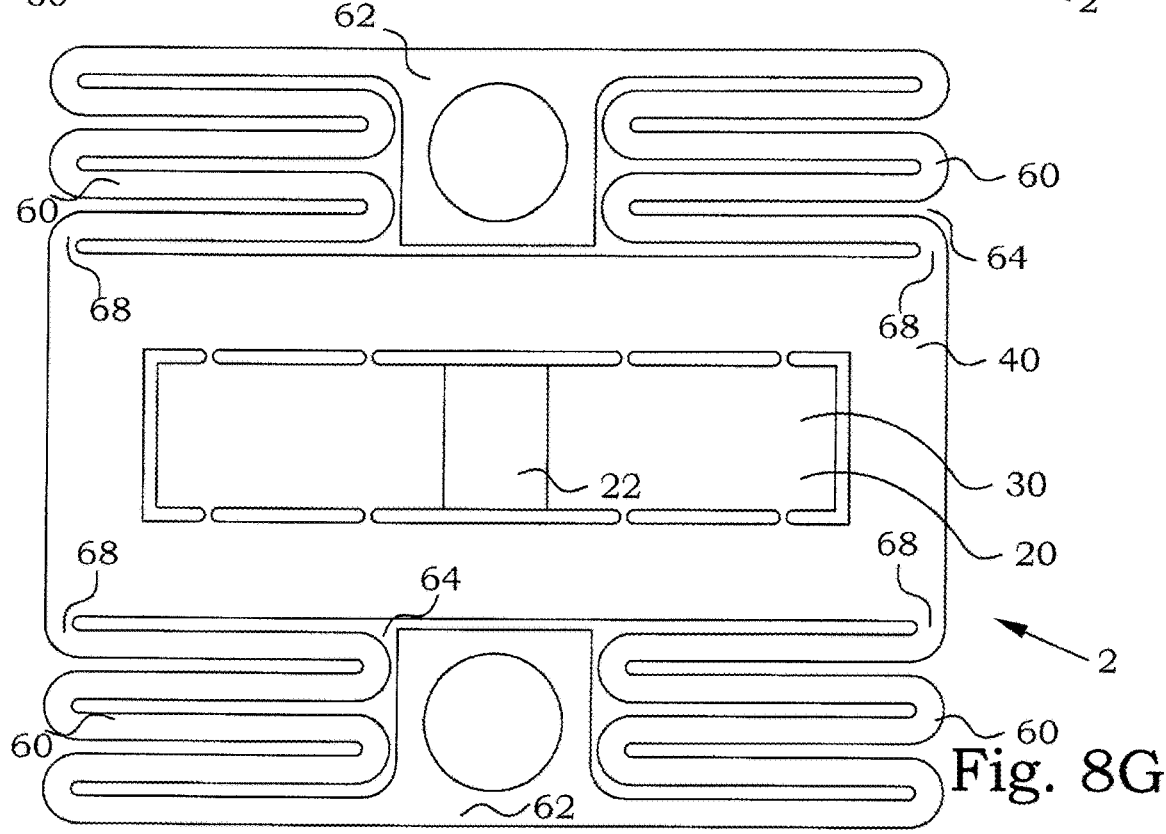

FIG. 8G illustrates an embodiment with a single support section 40 enclosing the actuator section 20.

Figure 8H:
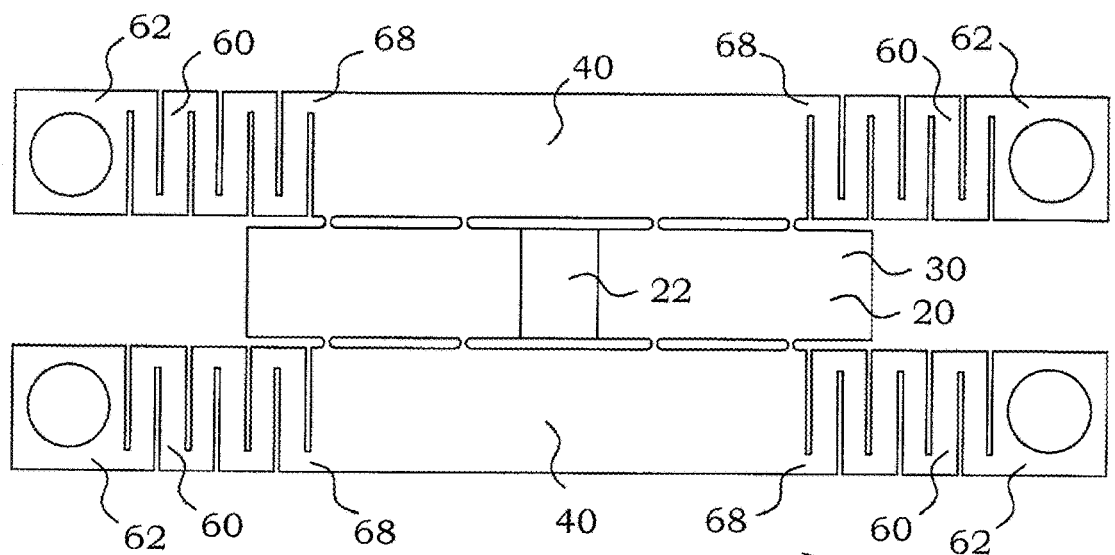

FIG. 8H illustrates an embodiment where the respective spring sections 60 are provided at a side of the support structures in the direction X of the intended motion of the motor. This makes the total motor narrower, but may require more free space along the motor.

Figure 9A:
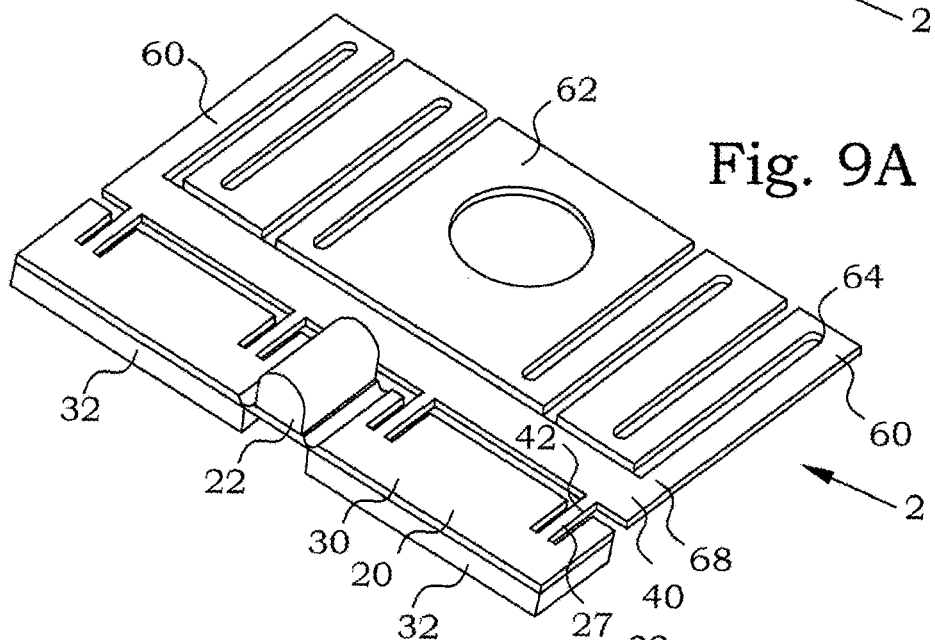
FIGS. 9A-B are two elevational views of an embodiment of an electromechanical stator having a support section on only one side.
Figure 9B:
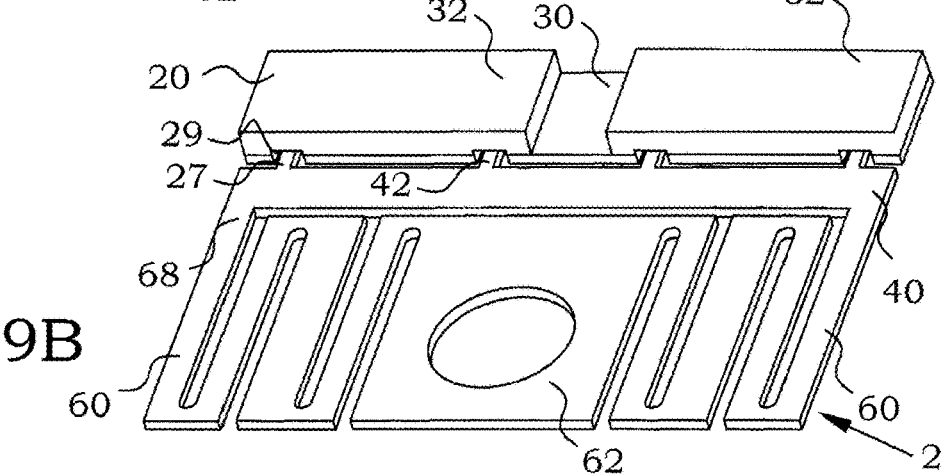

FIG. 9A illustrates an embodiment of an electromechanical stator 2 having its support section and spring section on only one side. This could e.g. be favourable in rotating motor applications. In this particular embodiment, the attachment members 42 are provided to act at the middle of the actuator section 20, in order to minimize any tendencies for tilting the actuator section as a result of the applied normal force. The attachment members 42 are therefore in this particular embodiment shaped as slender beams 27. FIG. 9B is a view from the bottom of FIG. 9A, showing how the attachment members 42 are given additional space for movements by provision of cavities 29.

Figure 9C:
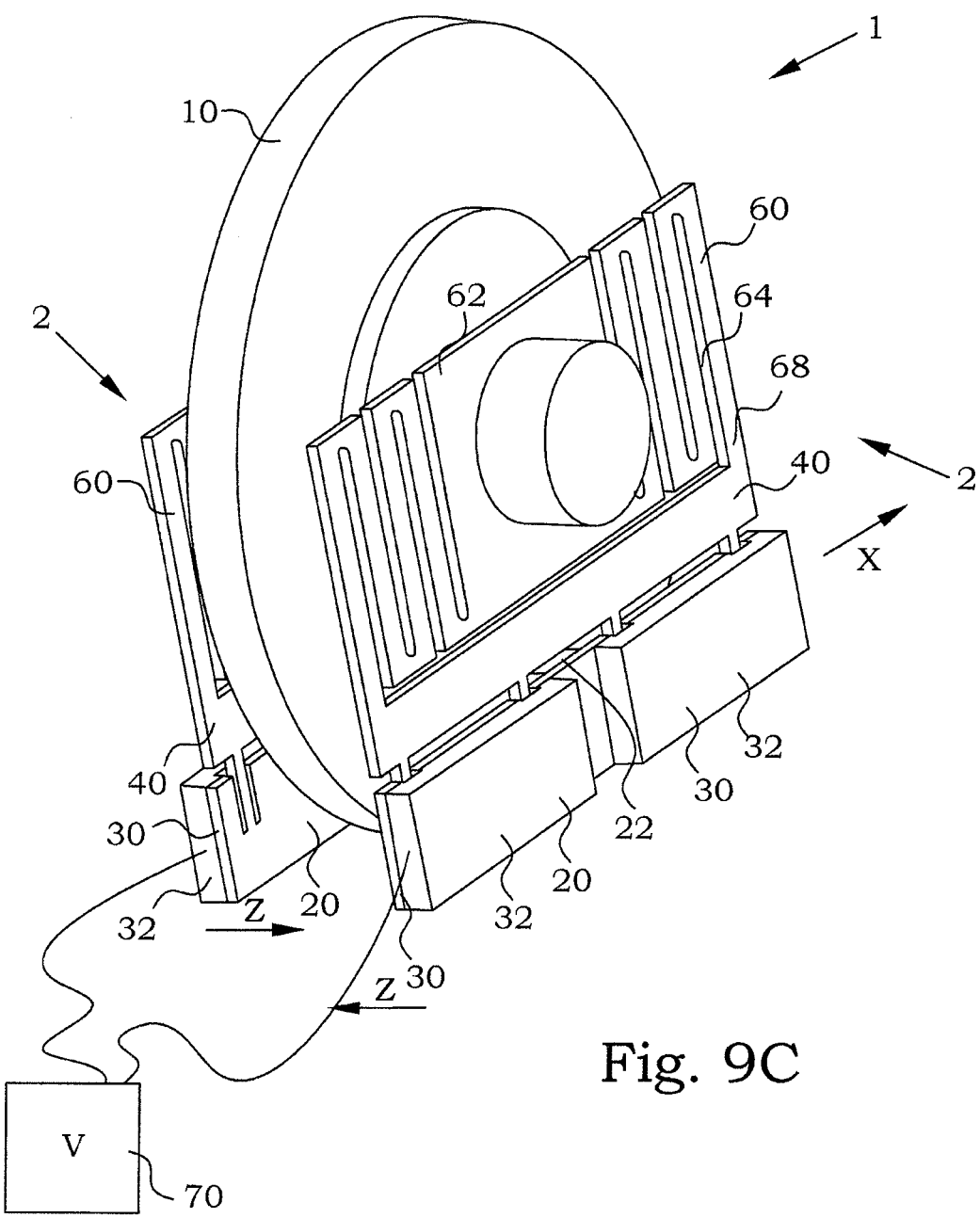
FIG. 9C is an elevational view of an embodiment of an electromechanical rotating motor having twin electromechanical stators according to FIGS. 9A-B.

In FIG. 9C, the electromechanical stator from FIGS. 9A-B is applied in an embodiment of a twin-stator design for a rotating electromechanical motor. The fixation points 62 are in this embodiment attached to the shaft 86 of the rotating electromechanical motor 1. Such an attachment is arranged in such a way that the fixation points 62 are freely rotatable in relation to the shaft 86, e.g. by some bearing arrangement, but locked for displacements along the shaft 86.

As can be seen in the discussions above, also the equivalent lumped mass of the electromechanical stator plays a role in finding suitable frequencies and spring properties. For instance, if a suitable spring section design, giving a requested spring constant has been found, but other parameters tend to cause a high recommended operation frequency, the frequencies can be adapted by adapting the mass of the support section. Since the support section does not essentially contribute to the spring action, but its mass contributes to the equivalent lumped mass of the electromechanical stator, additional mass can be added to the support section without significantly change the spring constant.

Figure 10A:
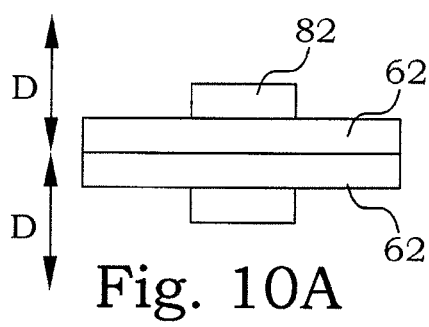
Figure 10B:
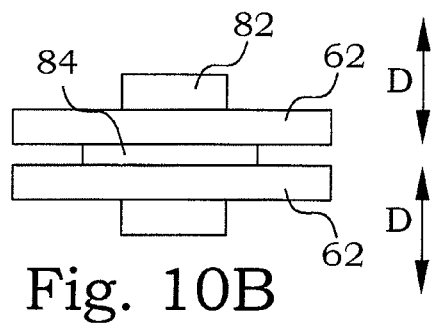

Another way of "tuning" the available ranges of operation frequencies, when a certain spring section design is fixed, is to modify the elastic deformation of the spring section. With reference to FIG. 10A, fixation points of two electromechanical stators in a twin-design are held together by the fixation means 82. Such a situation corresponds to a displacement of each fixation point by the distance D. If a lower normal force is requested, e.g. for reducing the lower end of recommended operation frequencies, the situation illustrated in FIG. 11B may be used. Here, a distance element 84, such as a washer can be supported between the fixation points 62. The displacement D of each fixation point 62 will thereby be reduced somewhat. In other words, by simply adapting the distance that the fixation points 62 are moved during mounting, an adapted normal force can be achieved. Distance elements 84 can easily be manufactured with a high degree of accuracy in thickness, which means that the applied normal force also can be tuned very accurately.

Similar situations for a single electromechanical stator mounted against e.g. a bearing arrangement 80 are depicted in FIGS. 10C-D.

In alternative embodiments, also plastic deformations of the continuous sheet of elastic material can be utilized to modify the displacement of the fixation points. FIG. 10E illustrates an electromechanical motor 1 having a twin-stator design in which the support sections 40 of each electromechanical stator 2 are plastically deformed before mounting. By this plastic deformation, the necessary displacement of the fixation points 62 can be adapted to the prevailing thickness of the body to be moved.

In such embodiment, one has to be particularly careful to control the displacement caused by the plastic deformation, since such manufacturing processes typically are not very accurate. Preferably, the continuous sheet of elastic material 5 of at least the spring section 60 is, in a state free from elastic deformation, still flat. This ensures that the spring constant properties are well defined.

FIG. 11 is a flow diagram illustrating steps of an embodiment of a method for operating an electromechanical motor. The electromechanical motor comprises an actuator section, a support section and a spring section. A continuous sheet of elastic material constitutes at least a part of the actuator section, at least a part of the support section and at least a part of the spring section. The actuator section comprises a vibration assembly in turn comprising at least one vibration body and a moved-body interaction portion. The vibration body comprises an electromechanical volume attached to a part of the continuous sheet of elastic material. The support section is attached between the actuator section and the spring section. The support section is connected with at least one fixation point via the spring section. The spring section is elastic, with a spring constant.

The method comprises the step S10, in which a normal force is provided in a vibration direction, transverse to the plane of the continuous sheet of elastic material, on the moved-body interaction portion. This normal force provision is performed in step S12 by displacing the fixation point in the vibration direction. In step S20, alternating voltages are applied to the electromechanical volume, causing the vibration body to perform bending vibrations in the vibration direction.

In a preferred embodiment, the applied alternating voltages are tuning to an operation frequency above a lowest natural resonance frequency of the entire electromechanical stator.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

The invention claimed is:

1. An electromechanical stator comprising:
   an actuator section;
   a spring section; and
   a support section attached between said actuator section and said spring section, said support section being connected with at least one fixation point via said spring section,
   wherein a continuous sheet of elastic material constitutes at least a part of said actuator section, at least a part of said support section, and at least a part of said spring section,
   said actuator section comprises a vibration assembly comprising
      at least one vibration body comprising an electromechanical volume attached to a part of said continuous sheet of elastic material, said at least one vibration body being configured to cause bending vibrations, in a vibration direction transverse to the plane of said continuous sheet of elastic material, when alternating voltages are applied to said electromechanical volume, and
      a moved-body interaction portion,
   wherein said spring section is elastic, with a spring constant, regarding displacements, in said vibration direction, of said at least one fixation point relative to a connection point between said spring section and said support section, thereby enabling provision of a normal force in said vibration direction on said moved-body interaction portion upon displacement of said at least one fixation point in said vibration direction, and wherein said continuous sheet of elastic material of said spring section has a pattern of cuts, providing at least one limited path between connection points to said support section and said at least one fixation point.

2. The electromechanical stator according to claim 1, wherein said support section and said spring section together constitute a low-pass filter of vibrations between said actuator section and said at least one fixation point.

3. The electromechanical stator according to claim 1, wherein said at least one limited path has a smaller average cross-section area than an average cross-section along a closest path between said connection points and attachment members between said actuator section and said support section.

4. The electromechanical stator according to claim 1, wherein said at least one limited path is curved.

5. The electromechanical stator according to claim 1, wherein said vibration assembly comprises two said vibration bodies interconnected by said moved-body interaction portion.

6. An electromechanical motor comprising:
the electromechanical stator according to claim 1;
a body to be moved; and
a voltage supply configured to supply alternating voltages to said electromechanical volume of said at least one vibration body.

7. The electromechanical motor according to claim 6, wherein said voltage supply is configured to supply said alternating voltages at an operation frequency at least five times above a frequency of:

$$f = \frac{1}{2\pi}\sqrt{c_{sp}/(m_{st})},$$

where $c_{sp}$ is said spring constant of said spring section and $m_{st}$ is an equivalent lumped mass of said electromechanical stator.

8. The electromechanical stator according to claim 1, wherein said support section is configured to at least partially prohibit rotational movements of said actuator section to propagate to said spring section.

9. The electromechanical stator according to claim 8, wherein said support section and said spring section together constitute a low-pass filter of vibrations between said actuator section and said at least one fixation point.

10. The electromechanical stator according to claim 1, wherein said continuous sheet of elastic material of at least said spring section being, in a state free from elastic deformation, flat.

11. The electromechanical stator according to claim 10, wherein said support section and said spring section together constitute a low-pass filter of vibrations between said actuator section and said at least one fixation point.

12. The electromechanical stator according to claim 10, wherein said support section is configured to at least partially prohibit rotational movements of said actuator section to propagate to said spring section.

13. The electromechanical stator according to claim 12, wherein said support section and said spring section together constitute a low-pass filter of vibrations between said actuator section and said at least one fixation point.

* * * * *